(12) United States Patent
Ohbayashi et al.

(10) Patent No.: US 7,114,856 B2
(45) Date of Patent: Oct. 3, 2006

(54) OPTICAL CONNECTOR SOCKET

(75) Inventors: Yoshiaki Ohbayashi, Nara (JP); Keiji Mine, Yao (JP); Hiroshi Nakagawa, Kyoto (JP)

(73) Assignee: Hosiden Corporation, Yao (JP)

( * ) Notice: Subject to any disclaimer, the term of this patent is extended or adjusted under 35 U.S.C. 154(b) by 0 days.

(21) Appl. No.: 10/617,713

(22) Filed: Jul. 14, 2003

(65) Prior Publication Data

US 2004/0033030 A1 Feb. 19, 2004

(30) Foreign Application Priority Data

Aug. 15, 2002 (JP) .............................. 2002-236805

(51) Int. Cl.
*G02B 6/36* (2006.01)

(52) U.S. Cl. .......................................... 385/88; 385/92

(58) Field of Classification Search ............. 385/53–55, 385/60, 66, 70, 73, 75–78, 88, 89, 92
See application file for complete search history.

(56) References Cited

U.S. PATENT DOCUMENTS

| | | | | |
|---|---|---|---|---|
| 4,993,803 | A * | 2/1991 | Suverison et al. ............. | 385/88 |
| 6,079,881 | A * | 6/2000 | Roth ............................. | 385/76 |
| 6,267,513 | B1 * | 7/2001 | Seto et al. ..................... | 385/56 |
| 6,481,902 | B1 * | 11/2002 | Takaoka et al. ............... | 385/92 |
| 6,652,152 | B1 * | 11/2003 | Yang et al. .................... | 385/53 |
| 6,715,930 | B1 * | 4/2004 | McBride ....................... | 385/73 |
| 6,715,931 | B1 * | 4/2004 | Chen et al. .................... | 385/78 |
| 6,767,138 | B1 * | 7/2004 | Miyachi et al. ............... | 385/76 |
| 6,821,023 | B1 * | 11/2004 | Grob et al. .................... | 385/73 |

FOREIGN PATENT DOCUMENTS

| | | |
|---|---|---|
| JP | 60-115211 | 8/1985 |
| JP | 61-56607 | 4/1986 |
| JP | 2000-131562 A | 5/2000 |
| JP | 2000-131564 | 5/2000 |
| JP | 2001-201663 | 7/2001 |

OTHER PUBLICATIONS

English translation of Office Action dated Dec. 20, 2005 in Japanese Patent Application No. 2002-236805.

* cited by examiner

*Primary Examiner*—Juliana Kang
(74) *Attorney, Agent, or Firm*—Armstrong, Kratz, Quintos, Hanson & Brooks, LLP

(57) ABSTRACT

An optical connector socket includes: a body having an insertion section in which a socket-side optical element is arranged and into which an optical connector plug is inserted; a cover, covered on the body, having an opening communicated with the insertion section; a shutter, openably/closably attached to the cover, for closing the opening; and a herical spring for elastically urging the shutter in a constant-closing direction. The opening is larger than an outside dimension of the optical connector plug inserted into the cover and smaller than that of the shutter. Therefore, there is no light leakage and dust intrusion, the socket can be attached to a device or a wall so as to direct an opening toward a front face without a cap, and an inspection in a state where the socket is assembled in an electronic device can be performed without attaching/detaching the cap to/from the socket.

3 Claims, 5 Drawing Sheets

OPTICAL CONNECTOR SOCKET

BACKGROUND OF THE INVENTION

1. Field of the Invention

The present invention relates to an optical connector socket.

2. Prior Art

This type of an optical connector socket is provided at a device for outputting and/or inputting a digital signal such as a stationary-type DVD, TV, STB (set top box: an adapter device for a satellite broadcast), CD, MD, amplifier or the like. Further, it has recently been used as an input/output terminal for computer communication using an optical fiber.

Conventional this type of optical connector sockets are those disclosed in, for example, Japanese Unexamined Patent Application No. 2000-131564 and Japanese Unexamined Patent Application No. 2001-201663. These optical connector sockets have a body provided with an insertion section having a socket-side optical device at the backside and a shutter for approximately closing the insertion section of the body. The aforesaid shutter is attached to the body so as to be capable of opening and closing the insertion section. This shutter aims mainly to prevent a dust or the like from getting into the insertion section of the body.

However, the above-mentioned conventional optical connector socket has the following problems.

Specifically, the shutter of these optical connector socket is attached on, the front surface of the body so as to be displaced inwardly of the body by pushing the optical connector plug into the insertion section, so that the dimension of the used shutter is slightly smaller than the dimension of the opening section of the insertion section. Therefore, in a so-called two-way optical connector having a light-emitting device and light-receiving device as a socket-side optical device, light from the light-emitting device is likely to leak to the outside. Since a disorder such as a damage in retina or the like is likely to occur when a man looks the light from the light-emitting device in the eye, the optical connector socket is attached such that the opening section is directed diagonally downward because a safety takes priority over the difficulty in inserting the optical connector plug.

Further, there is an optical connector socket having no shutter. In this case, a cap is fitted to the opening section of the insertion section for preventing a light leakage and intrusion of dust or the like. However, this cap is small, so that it may sometimes be lost. Moreover, infants are likely to mistakenly drink the cap.

Additionally, during a check of electrical equipment to which this optical connector socket is installed, for example, during a check of a set top box, the configuration in which the cap is fitted to the optical connector socket requires an operation of pulling out the cap for inserting the optical connector plug, and then, inserting the cap into the optical connector socket.

SUMMARY OF THE INVENTION

The present invention is designed in view of the above circumstances, and aims to provide an optical connector socket that prevents a light leakage and intrusion of dust, does not utilize a cap, can be installed to equipment or wall such that an opening section faces forward with respect to the equipment or wall and does not require an operation of pulling out and inserting a cap even during a check with the socket installed in the electrical equipment.

The optical connector socket according to the present invention comprises a body having a socket-side optical device installed therein and an insertion section to which a connected optical connector plug is inserted, a cover that is covered on this body and has an opening section communicating with the insertion section, a shutter openably and closably attached to the cover for closing the opening section and an elastic member that always elastically urges this shutter in a closing direction, wherein the opening section is set to have an outside dimension greater than the outside dimension of the optical connector plug inserted to the cover and smaller than the outside dimension of the shutter.

This optical connector socket can perfectly prevent a light leakage or intrusion of dust.

Further, a guide projection is provided at the inside of the insertion section of the body for guiding the inserted optical connector plug toward the socket-side optical device, wherein the guide projection becomes wider toward the backside of the insertion section.

This configuration enables to face the socket-side optical device of the optical connector socket to a plug-side optical device of the optical connector plug.

Further, provided at the backside from the guide projection is a locking recess section that engages with a locking convex section provided on an outer surface of the optical connector plug.

This configuration can assuredly fix the optical connector plug inserted into the optical connector socket.

DESCRIPTION OF THE PREFERRED EMBODIMENTS

Figure 1:
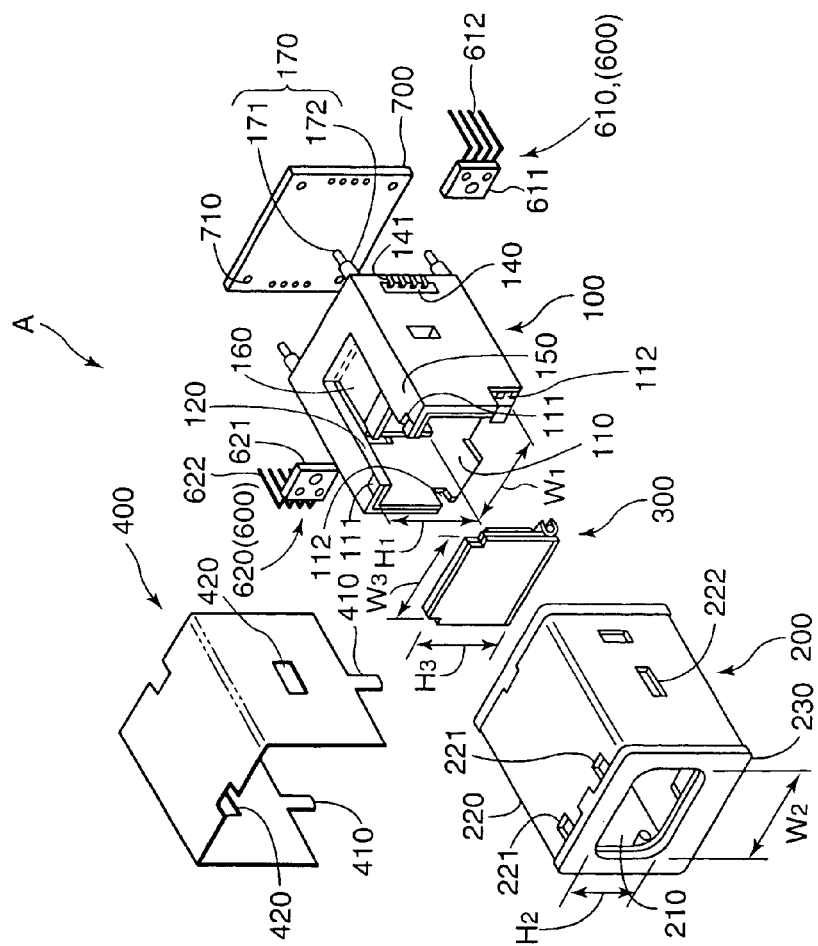
FIG. 1 is an exploded perspective view schematically showing an optical connector socket according to the embodiment of the present invention.
Figure 2:
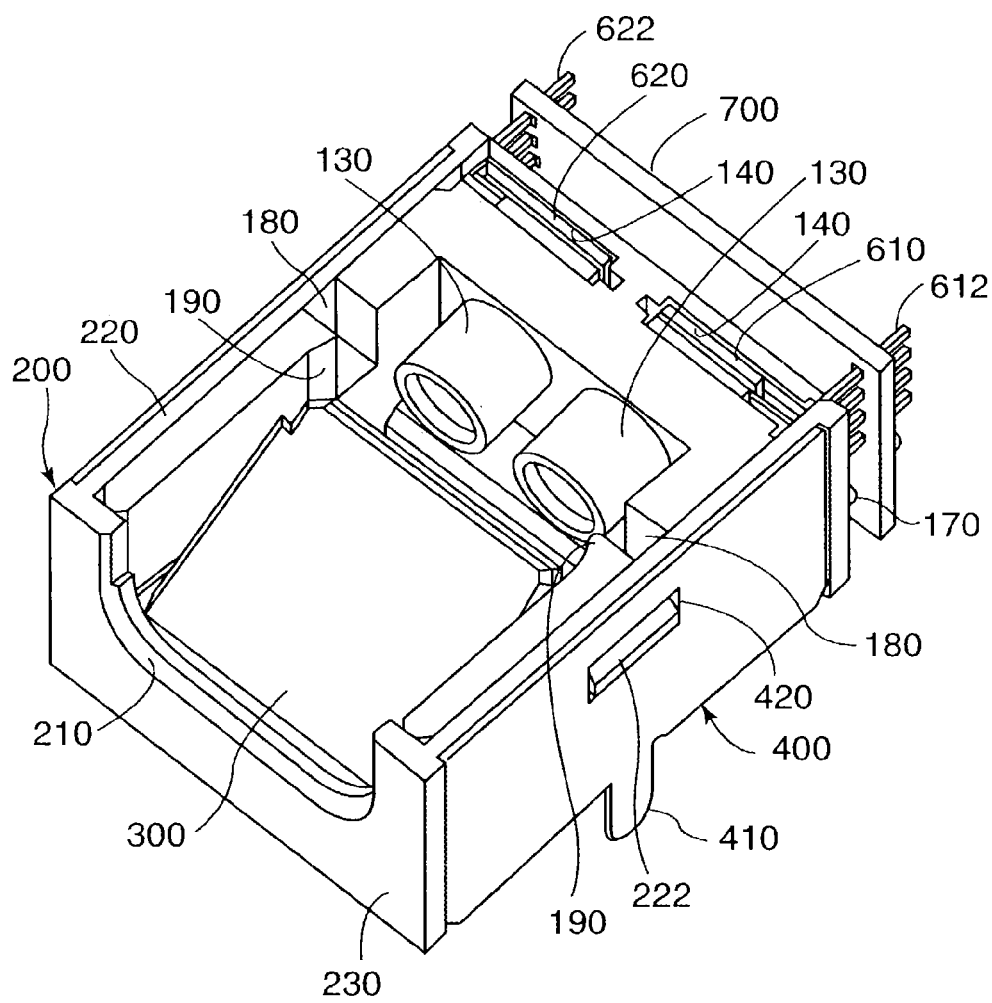
FIG. 2 is a partial cutaway perspective view schematically showing a state wherein a top surface of a shield cover, top wall of the cover and top wall section of a body are removed from the optical connector socket according to the embodiment of the present invention.
Figure 3:
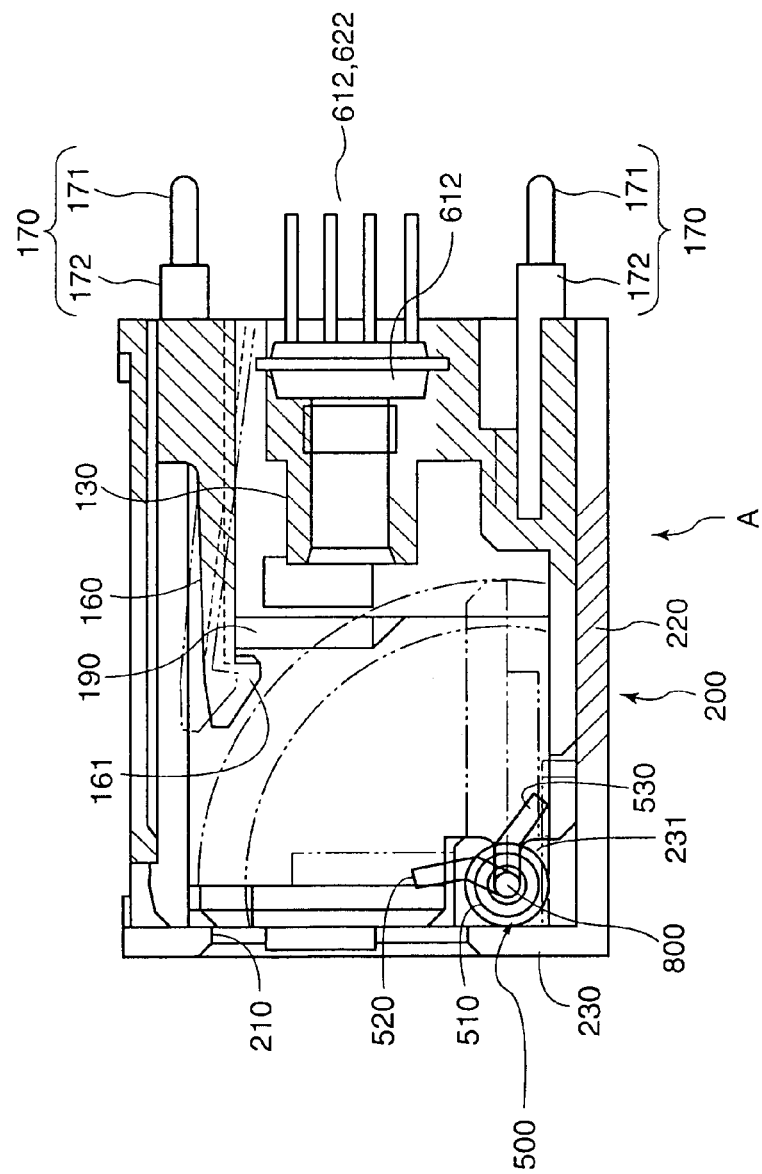
FIG. 3 is a longitudinal sectional view schematically showing the optical connector socket according to the present invention.
Figure 4:
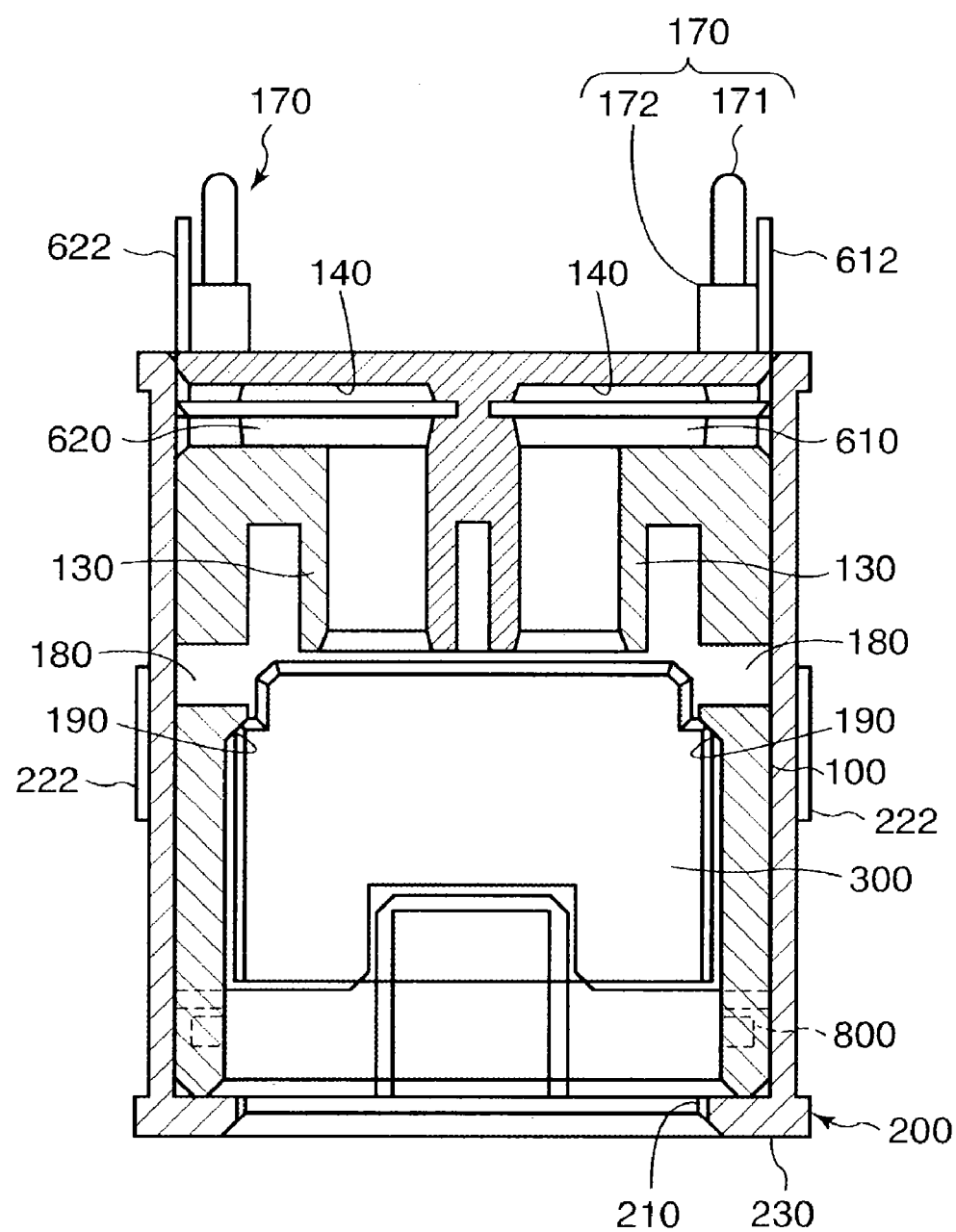
FIG. 4 is a cross-sectional side view schematically showing the optical connector socket according to the present invention.
Figure 5:
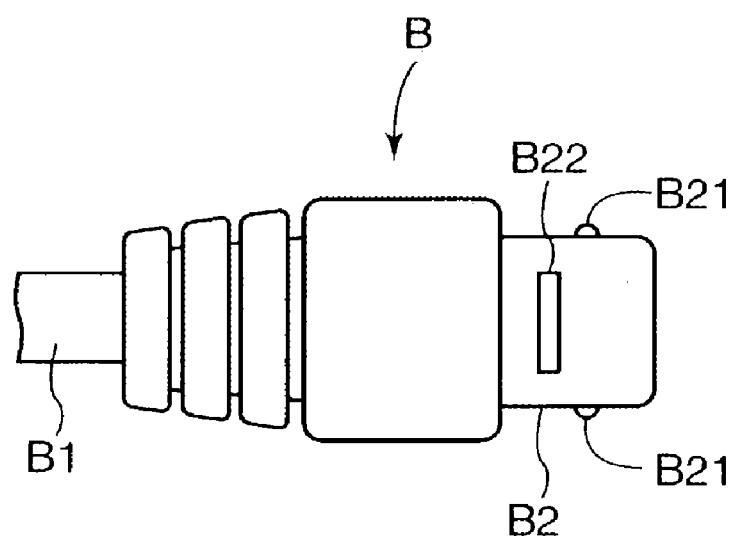
FIG. 5 is a schematic plan view showing an optical connector plug connected to the optical connector socket according to the present invention.

FIG. 1 is an exploded perspective view schematically showing the optical connector socket according to the present invention, FIG. 2 is a partial cutaway perspective view schematically showing a state wherein a top surface of a shield cover, top wall of the cover and top wall section of a body are removed from the optical connector socket of the present invention, FIG. 3 is a longitudinal sectional view schematically showing the optical connector socket according to the present invention, FIG. 4 is a cross-sectional view schematically showing the optical connector socket according to the present invention and FIG. 5 is a schematic plan view showing an optical connector plug connected to the optical connector socket according to the present invention.

The optical connector socket A according to the embodiment of the present invention comprises a body 100 having a socket-side optical device 600 installed therein and an insertion section 110 to which a connected optical connector plug B is inserted, a cover 200 that covers the body 100 and has an opening section 210 communicating with the aforesaid insertion section 110, a shutter 300 openably and closably attached to the cover 200 so as to close the aforesaid opening section 210 and a helical spring 500 serving as an elastic member for elastically urging this shutter 300 toward its closing direction at all times, wherein the aforesaid opening section 210 is set to be greater than the outside dimension of the optical connector plug inserted into the cover 200 as well as smaller than the outside dimension of the shutter 300.

Before explaining the optical connector socket A, the optical connector plug B connected to this optical connector socket A will firstly be explained.

This optical connector plug B, as shown in FIG. 5, has an optical fiber B1 and a plug body B2 made of synthetic resin and obtained by molding the optical fiber B1.

An opening (not shown) that faces to the edge section of the optical fiber B1 is formed at the leading edge of the above-mentioned plug body B2. Further, provided at both of left and right side faces of the plug body B2 are locking convex sections B21 that are engaged with locking recess sections 180 of the optical connector socket A. Additionally, formed on the top surface of this plug body B2 is a locking groove B22 that is engaged with a locking pawl 160 of the optical connector socket A.

The above-mentioned body 100 is molded by synthetic resin or the like having insulating property and has formed thereto the insertion section opens from its front side toward its backside. Provided at the backside of this insertion section 110 are two parallel cylindrical light-shielding cylinders 130 each having an opening section facing to the opening section of the insertion section 110. The socket-side optical device 600 described later is set to the backside of these light-shielding cylinders 130. Provided at the backsides of both left and right side faces of the body 100 are optical device insertion openings 140 that communicate with the aforesaid light-shielding cylinders 130. The socket-side optical device 600 inserted from the optical device insertion opening 140 is positioned at the rear of the light-shielding cylinder 130.

Provided at the trailing edge sides of the above-mentioned optical device insertion openings 140 are slits for lead 141 to which lead terminals 612 and 622 of the socket-side optical device 600 inserted into the optical device insertion openings 140 are fitted. Because of the existence of these slits for lead 141, the lead terminals 612 and 622 of the socket-side optical device 600 are positioned at the backside from the surfaces of left and right wall sections of the body 100. Therefore, the above-mentioned lead terminals 612 and 622 do not become obstacles upon covering the cover 200 over the body 100.

Further, the upper sidewall 150 of this body 100 has a notch 120 formed so as to direct from the front side toward the backside as shown in FIG. 1. Accordingly, the aforesaid upper sidewall 150 is formed approximately into a shape of a concave character as seen flatly. The locking pawl 160 for locking the inserted optical connector plug B is provided from the backside toward the front side of the aforesaid notch 120. This locking pawl 160 has formed at its leading edge a projecting section 161 that slopes downward to project downwardly toward the backside, this projecting section 161 being engaged with the locking groove B22 of the inserted optical connector plug B. It is to be noted that this locking pawl 160 is set to have a length so as not to hinder the opening and closing of the shutter 300.

Moreover, guide projections 190 that become wider in width toward the backside of the insertion section are provided at the insides of both left and right sidewalls of this body 100. These guide projections 190 are for guiding the optical connector plug B inserted to the insertion section 110 to a predetermined position, i.e., for guiding the optical fiber B1 of the optical connector plug B to a position facing to the light-shielding cylinder 130 and consequently, to the socket-side optical device 600. Accordingly, a size of the narrowest section between a pair of guide projections 190 provided at both left and right sidewalls is set slightly smaller than the outer shape of the optical connector plug B.

Locking recess sections 180 that are engaged with the locking convex sections B21 formed at the outer surface of the optical connector plug B are formed at the insides of both left and right sidewalls of the body 100 and at the backsides from the above-mentioned guide projections 190. These locking recess sections 180 are holes penetrating the aforesaid left and right sidewalls. Therefore, the locking convex sections B21 of the optical connector plug B climbing over the guide projections 190 are fitted to the locking recess sections 180, to thereby be locked with respect to the body 100.

The notches 112 for the shutter where shaft fitting sections 231 of the cover 200 enter upon attaching the cover 200 are formed at the frontward lower sides of the left and right sidewalls of this body 100, i.e., at the left and right frontward lower sides of the insertion section 110. These notches for the shutter 112 are open to the front side of the body 100.

Additionally, mounting bosses 170 with four steps are projected from the trailing edge of this body 100. These mounting bosses 170 are inserted into holes 710 at a printed circuit board 700. The diameter of the aforesaid hole 710 is set such that a small diameter section 171 at the leading edge side of the mounting boss 170 can be inserted thereto but a large diameter section 172 of the base side cannot be inserted thereto. Therefore, the small diameter section 171 of the mounting boss 170 is inserted into the aforesaid hole 710 and the small diameter section 171 is melted, whereby the optical connector socket A can be installed at a position apart from the printed circuit board 700 by a height of the large diameter section 172.

Further, approximately wedge-shaped projecting sections 111 are formed at both left and right side faces of the aforesaid notch 120 on the top surface of the front edge section of this body 100. These projecting sections 111 are provided for fixing the cover 200 described later to the body 100.

The above-mentioned shutter 300 is molded by synthetic resin or the like having insulating property and formed into an approximately rectangular shape as a whole. A size W3 of a lateral width of this shutter 300 is set smaller than a lateral width W1 of the insertion section 110. Similarly, a height H3 of the shutter 300 is set smaller than a height H1 of the insertion section 110. Accordingly, the shutter 300 can fall inwardly of the insertion section 110 of the body 100. It is to be noted that this shutter 300 can be made not only of the synthetic resin or the like having insulating property but also of a metallic material or synthetic resin having conductivity.

Further, a single support shaft 800 is fittingly engaged with the shaft engaging sections 231 formed at both lower sides at the back surface side of this shutter 300. This support shaft 800 serves as a center of the pivotal movement of this shutter 300.

When the cover 200 is attached to the body 100 with the support shaft 800 of the shutter 300 fittingly engaged with the shaft engaging sections 231, the shaft engaging sections 231 are fitted into the notch section 112 for the shutter by the body 100 for closing the shaft engaging sections 231 with the body 100, so that the shutter 300 can securely be shaft-supported to the cover 200.

Externally fitted at nearly the center of the above-mentioned support shaft 800, as shown in FIG. 3, is the helical spring 500 serving as an elastic member for always elastically urging the shutter 300 shaft-supported by the body 100 toward the closing direction. This helical spring 500 is composed of a helical section 510 having the aforesaid support shaft 800 internally fitted thereto and one end 520 and the other end 530 of the helical section 510. The above-mentioned one end 520 and the other end 530 are extended to a tangential direction of a coil of the helical spring 500.

With the aforesaid support shaft 800 internally fitted to the helical spring 500, the one end 520 of this helical spring 500 comes in contact with the rear surface of the shutter 300 while the other end 530 thereof comes in contact with the bottom surface of the insertion section 110 of the body 100 respectively. Accordingly, the displacement from the opening direction to the closing direction of the shutter 300 is performed against the elastic force of the helical spring 500. Therefore, the shutter 300 is always elastically urged toward the closing direction by the helical spring 500.

On the other hand, the cover 200 covered over the aforesaid body 100 is molded by synthetic resin or the like having insulating property. This cover 200 is integrally formed by a cover main section 220 having a square pole shape and provided with top, bottom, left and right walls and an approximately frame-like shaped front frame section 230 provided at the front side of the cover main section 220.

Formed at the aforesaid front frame section 230 is an opening 210 that communicates with the above-mentioned insertion section 110 when the cover 200 is covered over the body 100. This opening 210 has an approximately rectangular shape and is set to have a lateral width W2 smaller than the lateral width W3 of the shutter 300 and a height H2 lower than the height H3 of the shutter 300. Therefore, the above-mentioned opening 210 is set greater than the outer dimension of the optical connector plug B inserted into the cover 200 as well as smaller than the outer dimension of the shutter 300.

Accordingly, the relationships of H1>H3>H2, W1>W3>W2 are established among the lateral width W2 and the height H2 of the opening 210, the lateral width W3 and the height H3 of the shutter 300 and the lateral width W1 and the height H1 of the insertion section 110. Therefore, the opening 210 can surely be closed when the shutter 300 is in the closing state, thereby preventing light from the light-emitting device 610 of the socket-side optical device 600 from leaking to the outside and preventing unnecessary light from the light-receiving device 620 of the socket-side optical device 600 from being received as a signal.

Moreover, the shaft engaging sections 231 to which the both ends of the aforesaid support shaft 800 are fitted are provided at both left and right lower sides at the back surface of the aforesaid front frame section 230. When the support shaft 800 attached to the shutter 300 is fittingly engaged with the shaft engaging sections 231, the shutter 300 is pivoted inwardly about the support shaft 800.

One rectangular-shaped projection 222 for being engaged with a shield cover 400 described later is projectingly provided at each of the left and right sidewalls of the cover main section 220 of the cover 200. Further, the aforesaid front frame section 230 and the trailing edge section are formed to be slightly higher than the top, bottom, left and right wall sections of the cover main section 220, whereby they are flatly attached to the surface of the shield cover 400.

Moreover, formed at the front edge section of the top wall of this cover 200 are fitting holes 221 to which the projecting sections 111 of the aforesaid body 100 are fitted. The cover 200 is fixed to the body 100 by fitting the projecting sections 111 to the fitting holes 221.

The above-mentioned socket-side optical device 600 comprises the light-emitting device 610 that converts an inputted electrical signal into an optical signal and outputs the resultant and the light-receiving device 620 that converts an inputted optical signal into an electrical signal and outputs the resultant. This light-emitting device 610 is fabricated such that a light-emitting chip is molded at nearly the center of a thin-sized rectangular-shaped mold resin 611 and lead terminals 612 connected to the light-emitting chip are externally projected from the mold resin 611. The aforesaid light-receiving device 620 is fabricated such that a light-receiving chip is molded at nearly the center of a thin-sized rectangular-shaped mold resin 621 and lead terminals 622 connected to the light-receiving chip are externally projected from the mold resin 611.

When these light-emitting device 610 and the light-receiving device 620 are inserted into the body 100 from the optical device insertion opening 140, the respective light-emitting chip and the light-receiving chip are positioned at the backside of the light-shielding cylinders 130.

It is to be noted that the lead terminals 612 and 622 of the light-emitting device 610 and the light-receiving device 620 are formed so as to be bent at an approximately right angle for directing toward the rear of the optical connector socket A.

Additionally, covered over this optical connector socket A is the shield cover 400 formed by bending a conductive metal plate. This shield cover 400 is formed into an approximately a concave character in a downward direction and covers the top, left and right walls of the cover 200 covered over the body 100. Tongue-piece sections 410 projecting downwardly are formed at left and right lower sides of the shield cover 400. These tongue-piece sections 410 are inserted into openings formed on a printed circuit board not shown for fixing the optical connector socket A to the aforesaid printed circuit board.

Rectangular-shaped openings 420 are formed at the left and right walls of this shield cover 400. These openings 420 are engaged with the projections 222 projectingly formed at the left and right sidewalls of the above-mentioned cover 200.

Subsequently explained is a connection between the optical connector socket A and the optical connector plug B having the above-mentioned configuration.

Firstly, the plug body B2 of the optical connector plug B is inserted into the opening 210 of the cover 200 from the insertion section 110. Then, the shutter 300 is pressed by the plug body B to thereby fall downwardly against the elastic force of the helical spring 500. Further, when the plug body B2 is inserted into the insertion section 110, the leading edge of the plug body B2 comes in contact with the guide projections 190 of the body 100. When the plug body B2 is further inserted into the insertion section 110 with this state, the optical fiber B1 of the optical connector plug B surely faces to the socket-side optical device 600 since the plug body B2 is guided by the guide projections 190.

When the plug body B2 is inserted into the insertion section 110 to the end, the locking convex sections B21 of the optical connector plug B climbing over the guide projections 190 are engaged with the locking recess sections 180 of the body 100. Simultaneously, the projecting section 161 of the locking pawl 160 of the body 100 is engaged with the locking groove B22 of the plug body B2.

With this state, the optical fiber B1 at the light-receiving side of the optical connector plug B surely faces to the light-emitting device 610 of the socket-side optical device 600 of the optical connector socket A, while the optical fiber B1 at the light-emitting side of the optical connector plug B surely faces to the light-receiving device 620 of the socket-side optical device 600 of the optical connector socket A. As a result, the optical connector plug B is completely connected to the optical connector socket A.

In the case of pulling out the optical connector plug B inserted into the optical connector socket A, the plug body B2 is pulled outwardly. Then, the locking convex sections B21 of the optical connector plug B climb over the guide projections 190 adjacent to the locking recess sections 180 of the body 100, thereby providing a disengagement. Simultaneously, the locking projection 161 of the locking pawl 160 comes out of the locking groove B22 of the plug body B2, thereby providing disengagement.

When the plug body B2 is completely pulled out from the insertion section 110, there is no external force to the shutter 300, whereby the shutter 300 rises up to return to the original position, i.e., the position for closing the insertion section 110, due to the elastic force of the helical spring 500.

Although the optical connector socket A is a so-called two-way optical connector socket in which the socket-side optical device 600 has the light-emitting device 610 and the light-receiving device 620 in the above-mentioned embodiment, it is needless to say that the present invention can be applied to a so-called one-way optical connector socket having only one of the light-emitting device and light-receiving device.

The optical connector socket according to the present invention comprises a body having a socket-side optical device installed therein and an insertion section to which a connected optical connector plug is inserted, a cover that is covered on this body and has an opening section communicating with the insertion section, a shutter openably and closably attached to the cover for closing the opening section and an elastic member that always elastically urges this shutter in a closing direction, wherein the opening section is set to have an outside dimension greater than the outside dimension of the optical connector plug inserted to the cover and smaller than the outside dimension of the shutter.

Therefore, the opening section is surely closed by the shutter in case where the optical connector plug is not connected to the optical connector socket, whereby there is no need to use a cap as conventionally, and a light leakage or intrusion of dust can be eliminated. Accordingly, there is no concern about the occurrence of a disorder such as a damage in retina or the like when a man looks the light from the light-emitting device in the eye. Therefore, it is unnecessary to perform an attachment such that the opening section is directed diagonally downward as conventionally, so that it is possible to give priority to the easiness upon inserting the optical connector plug. Further, operation of pulling out and inserting a cap is not required even during a check with the socket installed in the electrical equipment.

Further, a guide projection is provided at the inside of the insertion section of the body for guiding the inserted optical connector plug toward the socket-side optical device, wherein the guide projection becomes wider toward the backside of the insertion section.

Therefore, the socket-side optical device of the optical connector socket can surely be faced to a plug-side optical device of the optical connector plug.

Further, provided at the backside from the guide projection is a locking recess section that engages with a locking convex section provided on an outer surface of the optical connector plug.

Therefore, the optical connector plug inserted into the optical connector socket can surely be fixed.

The above-mentioned socket-side optical device comprises a light-emitting device and a light-receiving device. Accordingly, the optical connector socket can be provided that is safety and has reduced checking process even with being installed to electrical equipment.

What is claimed is:

1. An optical connector socket comprising:
a body having a socket-side optical device installed therein and an insertion section to which a connected optical connector plug is inserted,
a cover that is covered on the body and having a front frame section, the front frame section having an opening section communicating with the insertion section;
a shutter openably and closably attached to the cover for closing the opening section and a helical spring that always elastically urges the shutter in a closing direction, against a back surface of the frame section;
wherein the opening section is set to have an outside dimension greater than the outside dimension of the optical connector plug inserted into the cover and smaller than the outside dimension of the shutter;
wherein the helical spring urges the shutter so as to bring all the periphery of the shutter into abutment with a back surface of the first frame section;
wherein a pair of guide projections is provided at the inside of the insertion section of the body for guiding the inserted optical connector plug toward the socket-side optical device, and
wherein a distance between the guide projections becomes narrower toward the backside of the insertion section.

2. The optical connector socket claimed in claim 1, wherein there is provided at the backside from the guide projections a locking recess section that engages with a locking convex section provided on an outer surface of the optical connector plug.

3. The optical connector socket claimed in claim 1 or 2, wherein the socket-side optical device is composed of a light-emitting device and a light-receiving device.

* * * * *